United States Patent

[11] 3,576,441

| [72] | Inventors | Raymond K. Adams<br>Oak Ridge;<br>John T. Hutton, Kingston, Tenn. |
|---|---|---|
| [21] | Appl. No. | 20,288 |
| [22] | Filed | Mar. 17, 1970 |
| [45] | Patented | Apr. 27, 1971 |
| [73] | Assignee | The United States of America as represented by the United States Atomic Energy Commission |

[54] ANALYTICAL PHOTOMETER-TO-DIGITAL COMPUTER INTERFACING SYSTEM FOR REAL TIME DATA REDUCTION
6 Claims, 3 Drawing Figs.

[52] U.S. Cl. .................................................. 250/218,
23/252, 356/197, 250/209, 340/347
[51] Int. Cl. ....................................................... G01n 21/26,
G08c 9/00
[50] Field of Search .......................................... 250/218,
219 (DD), 233, 209, 214; 356/196, 197; 23/252, 253; 340/347 (AD); 235/61.11 (E)

[56] References Cited
UNITED STATES PATENTS

| 3,312,828 | 4/1967 | Wingate | 250/233X |
| 3,351,744 | 11/1967 | Masterson | 235/61.11 |
| 3,487,400 | 12/1969 | Ludewig, Jr. et al | 250/233X |
| 3,493,731 | 2/1970 | Lemonde | 340/347X |
| 3,513,467 | 5/1970 | Sliwkowski | 340/347 |
| 3,514,613 | 5/1970 | Mashburn | 250/218 |

Primary Examiner—Walter Stolwein
Attorney—Roland A. Anderson

ABSTRACT: A computer interfacing system has been provided for directly presenting transmission value date signals into a computer from a photometric analyzer of the type wherein a multiplicity of discrete sample-containing chambers with axially aligned transparent windows are arranged within a centrifuge rotor, thereby providing rapid storage and reduction of photometric data. Synchronizing signals, one for each sample, taken from the rotor are used to trigger a sample and hold circuit connected to receive the corresponding transmission signal, which then allows the peak voltage of the signal to be read into the computer.

INVENTORS.
Raymond K. Adams
John T. Hutton
ATTORNEY.

INVENTORS.
Raymond K. Adams
John T. Hutton
BY
ATTORNEY.

3,576,441

ANALYTICAL PHOTOMETER-TO-DIGITAL COMPUTER INTERFACING SYSTEM FOR REAL TIME DATA REDUCTION

BACKGROUND OF THE INVENTION

The invention described herein relates generally to interfacing circuitry for identifying and digitalizing analog data signals and more specifically to an interfacing system for the real time computer application of data signals from a plurality of discrete samples contained in a centrifuge rotor rotating at a high rate of speed. The present invention was made in the course of, or under, a contract with the U.S. Atomic Energy Commission.

In the art of photometric analysis, a number of devices have been introduced in which discrete samples and individual glass or plastic reaction vessels are used; these vessels are moved past stations where additions, reactions, or measurements occur. The use of such devices in clinical laboratories has enormously increased the number of analyses which may be done in a given time and on a given sample. Even so, an enormous clerical workload usually remains, and estimates of the percentage of time that personnel devotes to the purpose in clinical laboratories have ranged from 20 to 70 percent. It would appear that computers could be easily adapted to solving the clerical workload problem; but computer application has been impractical due to the mismatch between the rate at which data are generated, the rate at which an analyst can evaluate it, and the rate at which a computer can reduce it to final form.

The basic problem with slow analyzers (about 20 seconds to 2 minutes between data points) has been that data are stored in the form of a strip chart record, of paper or magnetic tape, or of punched cards and complex interfacing is usually required. Baseline drift of mechanical, chemical, or electronic origin is indigenous to such slow output systems. If a computer is to be used efficiently, the data should be fed in directly at a high rate of speed and should be suitably initialized so that all signals are properly identified. By producing a large number of analyses in a small fraction of a second, electronic or other drift will be minimized.

In a fast analyzer wherein analyses are done in parallel with all reactions, additions, and other steps occurring for all analyses at the same time, the interval of light transmission measurements must be a very small fraction of the reaction time (that is, less than 1 percent of it). In practice, this means that variations between mixing times and the time required for all photometric measurements should be less than 0.1 second, and that the number of reactions run simultaneously should be large (15 to 90). A device known as the multistation, single channel analytical photometer has been provided with which this invention has been used to transfer data into a PDP—8 computer. In this analyzer, measured volumes of reagents and samples are placed in depressions in a fluorocarbon transfer disc. The depressions are arranged so that reagents and samples are unmixed at rest, but can move radially without mixing with adjacents sets of reagents and samples. The transfer disc is placed in a cuvette rotor and rotated. Centrifugal force moves all liquids out into rotor cuvettes which rotate past a stationary light beam. The signal obtained from a photomultiplier viewing the light transmitted through each cuvette as it passes provides a train of pulses which, in the case of a 15—cuvette rotor spinning at 500 r.p.m. are transmitted at 8.3 millisecond intervals. Thus, it can be seen that there is a need for an interfacing system whereby these very short duration pulses may be accurately read into a computer with proper identification of each sample. A more complete disclosure of the structural details of the above analytical photometer may be had by referring to copending U.S. application Ser. No. 784,739, filed Dec. 18, 1968 and having a common assignee with the present application.

With such an interface, data may be taken at preselected intervals, stored in a computer memory, and processed using programmed instructions. For example, programs that perform some of the following functions may be written: conversion from transmission to absorbance values; blank absorbance calibrations; determination of cuvette pathlength using standard absorbance solutions; determination of concentration when the samples include blank, standards and unknowns, and a program for rate reactions.

SUMMARY OF THE INVENTION

It is an object of this invention to provide an interfacing system for the real time application of rapidly occurring very short duration data signals to a digital computer.

Further, it is an object of this invention to provide an interfacing circuit for the direct application of transmission data signals from a spinning cuvette rotor of a photometric analyzer to a digital computer.

Yet another object of the present invention is to provide an interfacing system for the purpose set forth in the above objects which provides initializing commands for accurate identification of the data signals read into a computer.

Briefly, the present interfacing system comprises timing and data signal conditioning elements which provide: a first synchronization signal, termed the rotor pulse, which occurs slightly before the first sample data signal; a second synchronization pulse, termed the sample number pulse; and a data signal, termed the transmission signal, from a radiation detector element which contains the desired radiation transmission value for each sample. The rotor pulse addresses the computer as to the beginning of a series of sample measurements, while each sample pulse addresses the computer as to the particular sample and further triggers a peak-follower and holder circuit connected to receive the data signal so as to provide direct sequential read-in of the data signal to the computer.

Other objects and many of the attendant advantages of the present invention will become obvious from the following detailed description when taken in conjunction with the accompanying drawings.

DESCRIPTION OF THE PREFERRED EMBODIMENT

Figure 1:
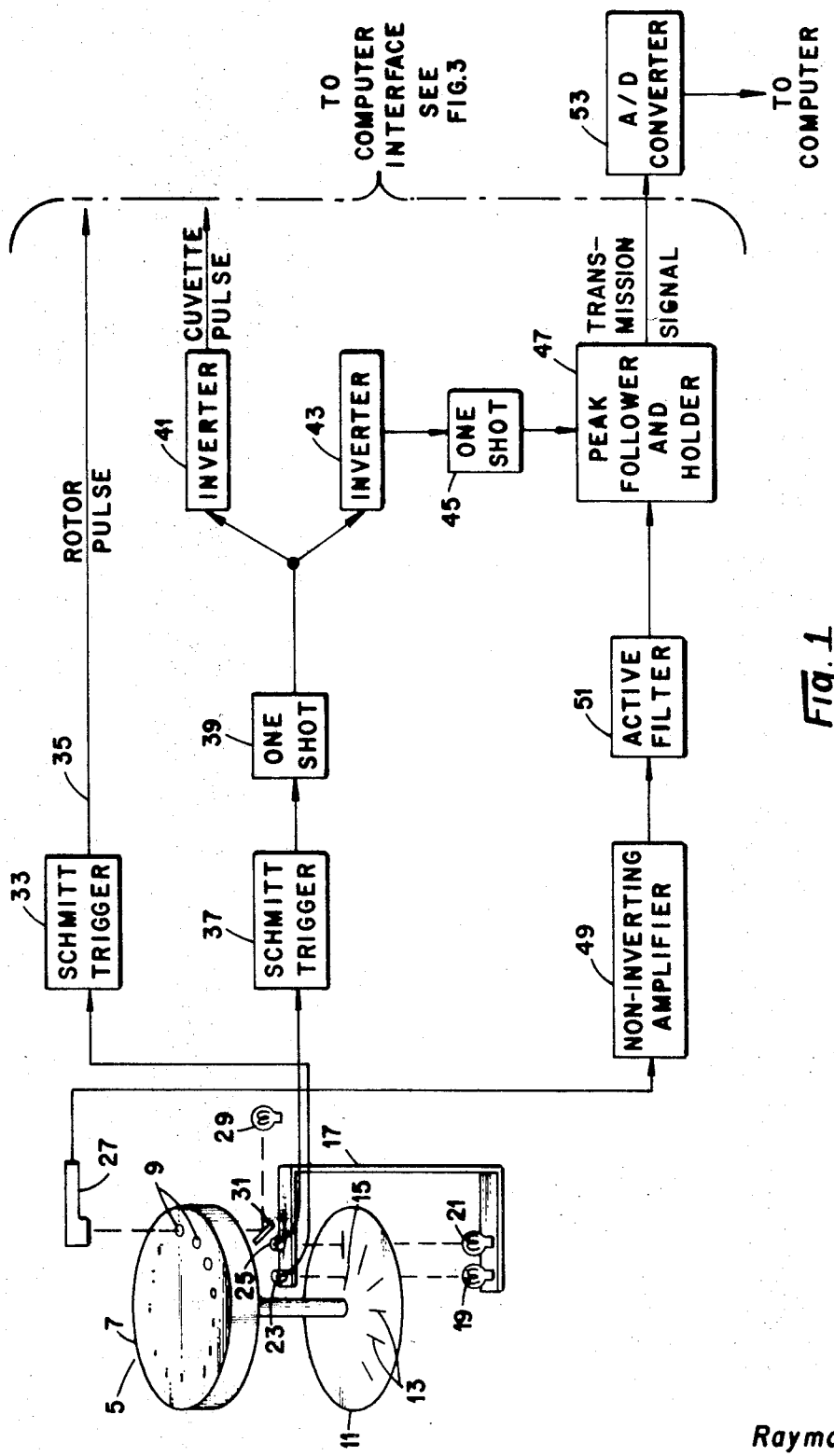
FIG. 1 is a block diagram of an interfacing system according to the present invention.

Referring now to FIG. 1, a portion of the photometric analyzer, as described in the above-referenced U.S. application, is shown schematically and generally indicated by reference number 5. The analyzer rotor 7 is power driven by means, not shown, in a conventional manner. Disposed within the rotor 7 are a plurality of sample containing cuvette chambers, one below each of the light-path defining holes 9. The analyzer rotor 7 has attached thereto, for synchronous rotation therewith, a synchronizing disc 11. The disc 11 has a plurality of slotted openings 13 radially positioned adjacent the periphery of the disc 11. Each slot 13 is in a particular alignment with a corresponding one of the plurality of cuvette chambers so as to provide the synchronizing cuvette pulse, the purpose of which will be explained hereinafter. The disc 11 is also provided with an additional slot 15 which is aligned with the rotor 11 at a radial position inward of the slots 13 so as to provide the rotor pulse as the rotor spins. This slot is aligned so that the rotor pulse occurs slightly before the illumination of cuvette No. 1, thereby providing the first synchronization signal.

A yoke 17 encompassing the edge of disc 11 carries a pair of light sources 19, 21 on the lower arm of yoke 17 extending beneath the disc 11 and a pair of photodetectors 23, 25 on the upper arm of yoke 17 extending over disc 11. The light source 19 and the detector 23 are aligned so as to provide an output pulse at the detector 23 output (rotor pulse) each time the slot 15 passes therebetween. The light source 21 and the detector 25 are aligned so as to provide an output pulse at the detector 25 output (cuvette pulse) each time a slot 13 passes therebetween. A third photodetector 27 is disposed above the rotor 5 and aligned to receive light transmitted through the cuvettes during rotation from a photometric light source 29 and a mirror 21 disposed below the rotor assembly and oriented to reflect the light beam upward, substantially normal to the plane of rotation of the rotor. The photodetector 27 comprises a photomultiplier tube disposed directly above the cuvette circle to receive all light transmitted upwardly through the axially aligned opening 9.

The electronic components shown in block diagram form in FIG. 1 for transmitting and initializing data signals for direct application to a digital computer consist throughout of standard components which are all well known and therefore need not be discussed here except for their novel combination described herein in order to completely describe the invention. Accordingly, the output of photodetector 23 is connected to a Schmitt trigger circuit 33 which provides a square wave-shaped pulse output on line 35. Line 35 is in turn connected to the computer interface (FIG. 3) to indicate the beginning of a set of readings. The output of photodetector 25 is connected to a second Schmitt trigger circuit 37 for the shaping of the cuvette pulse. This pulse is then fed to a "one shot" univibrator 39 whose output is connected to a pair of inverter circuits 41, 43. The output of inverter 41 is connected directly to an input of the computer interface indicating the cuvette number. The output of inverter 43 is connected to a second "one shot" univibrator 45 which in turn resets a peak follower and holder circuit 47.

The absorbance data signal taken from the photomultiplier 27 is fed into a noninverting amplifier 49 in which the data signal is amplified. High-frequency noise components of the amplified signal are removed in an active filter 51 connected to the output of amplifier 49 and the filtered data signal at the output of filter 51 is fed to the peak follower and holder 47. The peak follower and holder 47 holds the peak amplitude of the analog data signal at its output until reset by a pulse from the univibrator 45 applied to the reset input thereof. The output of the peak follower and holder 47 is fed into an analog-to-digital converter 53 which may form a part of a conventional signal active interface used with a general purpose digital computer such as the Model PDP—8 supplied by Digital Equipment Corporation of Maynard, Massachusetts.

OPERATION

Figure 2:
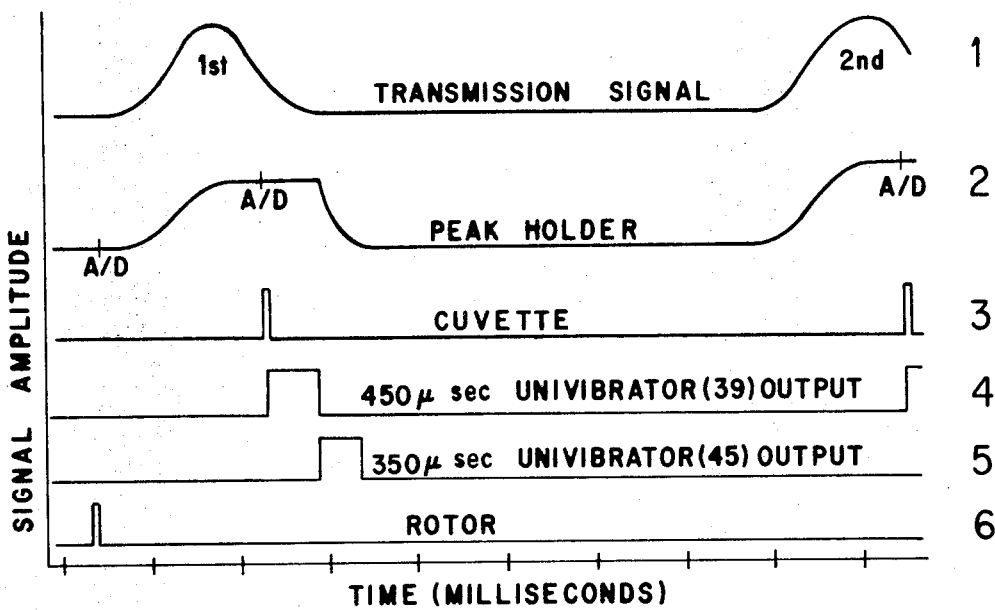
FIG. 2 is a graphic diagram of the preferred timing sequence of the pulses at various points in the diagram of FIG. 1.

The operation of the subject device may be best understood by referring to the timing sequence graph shown in FIG. 2. Just in advance of arrival of cuvette No. 1 at the measuring position, a rotor pulse is sensed by detector 23 and shaped into a square wave (line 6, FIG. 2) by trigger circuit 33 and applied to the computer identifying the first of a series of data readings. Light transmission through cuvette No. 1 produces a transmission data signal similar to that shown in line 1 of FIG. 2. This then produces the illustrated signal, line 2, in the peak holder 47. During this time a cuvette pulse is received from trigger circuit 37 which results in operation of the first univibrator 39 which, when timed out, initiates operation of the second univibrator 45. The output from univibrator 45 resets the peak holder circuit making it ready to receive the next transmission data signal through cuvette No. 2, etc. As the rotor spins a rotor pulse is generated for each revolution to properly identify data being received by the computer. Each cuvette pulse causes the value in the peak holder 47, digitized by the A/D converter 53, to be read into the computer memory during the timing interval of the univibrator 39 by the negative going signal from the output of inverter 41 to an appropriate input of the computer interface. When the univibrator 39 times out, the positive going trailing edge of the inverter 43 triggers univibrator 45 thereby supplying a delayed positive going reset pulse (line 5, FIG. 2) to the peak holder 47 after the peak transmission signal is read into the computer. By keeping the peak follower and holder circuit active during the entire transmission data signal time, the reading into the computer is always the peak transmission signal amplitude as shown by the A/D identification, line 2, along the peak amplitude of the peak holder 47 output.

The data obtained during each short data-taking interval should include a measurement of the baseline current (called dark current); a water, air, or reagent blank; a series of standards, if required; and a series of unknowns. Since the rotor signal occurs between the last and first cuvette, it is used also to signal to the computer to take a dark-current reading. This occurs, as shown in FIG. 2, at the A/D conversion indication along the baseline of the peak holder output, coincident with the rotor pulse (line 6).

Both the rotor synchronization and cuvette synchronization pulses may be moved in time with respect to the transmission data signal by displacement of the yoke 17 relative to the disc 11 in order to optimize the pulse timing.

Figure 3:
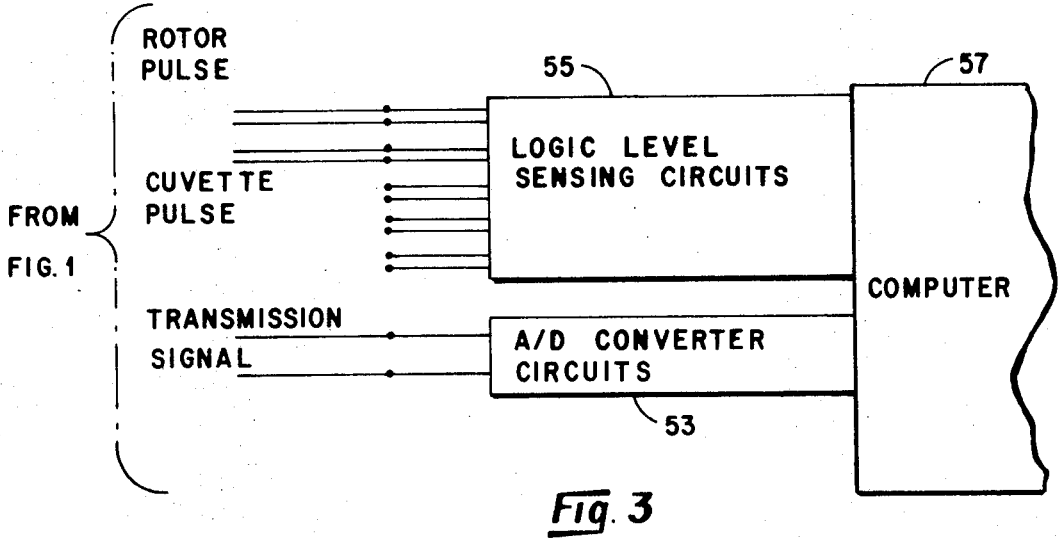
FIG. 3 is a diagram of a standard computer signal active interface used in conjunction with the outputs of FIG. 1.

A conventional signal active interface of a computer is shown in block diagram form in FIG. 3 for convenience in showing the application of the synchronizing pulses and the data signal to the computer. Only those components used in conjunction with the present invention are shown. The rotor and cuvette pulses are fed into a conventional logic level-sensing circuit 55 which allows the computer to identify the data pulses in a conventional manner and instructs the computer when to read the pulses. The transmission data signals are fed into an A/D converter 53, also shown in FIG. 1, which then feeds the data in digital form into the computer 57 upon command from the sensing circuit 55.

Once the computer is "on line" with a fast analyzer of this type, data may be obtained at a very rapid rate. Programs have been written which allow the operator to determine how many times he wishes the cuvettes read and which then print out the average value obtained and the standard deviation. The described system has been used for the determination of succinic dehydrogenase, cytochrome oxidase, total protein and cholesterol. A number of other analyses of clinical interest are being examined. The standard deviation, with five data points per cuvette, has been within 0.5 percent when standard solutions were used. The results are clearly an improvement over the conventional interfacing systems where the computer is timed to read directly the data signal peak at the same place on each revolution. Because the interface detects and holds the peak voltage, the computer is assured of reading the peak signal.

Thus, it will be seen that an analytical photometer-to-digital computer interfacing system has been provided for the real time application of rapidly occurring very short duration data signals with proper identification of each of the signals. Although the present invention has been described by way of illustration, it will be obvious to those skilled in the art that the system may also be used in fields other than that described and that the invention should be limited only by the following claims forming a part of this specification.

We claim:

1. In a device for measuring the transmission of radiation through a plurality of discrete samples disposed in a spinning rotor and oriented in a circular array about the center of rotation of said rotor, a computer-interfacing system for real time application of sample transmission data signals sequentially to a digital computer provided with at least a first and second synchronizing inputs and a data-receiving input, comprising:

a synchronizing disc coaxially mounted for rotation with said rotor, said disc having openings therethrough radially aligned with corresponding samples, respectively;

means for sensing the position of a first one of said samples and providing a first synchronizing pulse output to said first synchronizing input of said computer before said first sample arrives into measuring position;

means for sensing the passing of each of said openings of said disc and providing a second synchronizing pulse output coincident with the passing of each of said samples through said measuring position;

means for sensing said radiation transmission through said samples and providing an analog output signal proportional to the level of said radiation transmission through said samples;

a peak follower and holder circuit having an input connected to receive said analog signal, a reset input, and an output circuit for holding the peak level of said analog signal until reset by a reset pulse applied to said reset input thereof;

an analog-to-digital converter connected to the output of said peak follower and holder circuit, said analog-to-digital converter having its output connected to said data receiving input of said computer; and switching means connected to receive each of said second synchronizing pulses for generating a delayed reset pulse at the output thereof connected to said reset input of said peak follower and holder circuit whereby said digital signal is read into said computer during said second synchronizing pulse and said peak follower and holder circuit is reset in advance of a succeeding sample transmission data signal.

2. The computer interfacing system as set forth in claim 1 wherein the device is a photometric solution analyzer wherein a first light source is disposed so as to transmit light through said samples at said measuring position and said means for sensing said radiation through said samples includes a first photodetector having its output coupled to said analog signal input of said peak follower and holder circuit.

3. The computer interfacing system as set forth in claim 2 wherein said means for sensing the position of a first one of said samples and providing a first synchronizing pulse output comprises an additional slot in said synchronizing disc of said first sample, a second light source disposed so as to direct light through said additional slot in advance of said sample into said measuring position, a second photodetector disposed so as to receive the light passing through said additional slot to provide said first synchronizing pulse at the output of said second photodetector and means connecting said output of said second photodetector to said first synchronizing input of said computer.

4. The computer interfacing system as set forth in claim 3 wherein said means for sensing the passing of each of said plurality of openings of said disc and providing said second synchronizing pulse comprises a third light source disposed so as to direct light through said openings at a position coincident with said measuring position, a third photodetector disposed so as to view the light passing through said plurality of slots from said third light source, a first Schmitt trigger circuit connected to the output of said third photodetector, a first univibrator connected to the output of said first Schmitt trigger circuit and a first inverter circuit having its input connected to the output of said first univibrator and its output connected to said second synchronizing input of said computer.

5. The computer interfacing system as set forth in claim 4 wherein said switching means includes a second inverter connected to the output of said first univibrator, and a second univibrator connected to the output of said second inverter and having its output connected to said reset input of said peak follower and holder circuit.

6. The computer interfacing system as set forth in claim 5 further including a noninverting amplifier connected in series with the output of said first photodetector and a filter circuit connected between the output of said amplifier and the input of said peak follower and holder circuit.